US012282483B2

(12) United States Patent
Dearth et al.

(10) Patent No.: US 12,282,483 B2
(45) Date of Patent: Apr. 22, 2025

(54) SYSTEMS AND METHODS FOR USING A STRUCTURED DATA DATABASE AND FOR EXCHANGING ELECTRONIC FILES CONTAINING UNSTRUCTURED OR PARTIALLY STRUCTURED DATA

(71) Applicant: PwC Product Sales LLC, New York, NY (US)

(72) Inventors: Brian Dearth, Southlake, TX (US); Ryan Nemmers, Dallas, TX (US); Louis Koven, Dallas, TX (US); Scott Stein, Cherry Hill, NJ (US); Robert Baldwin, Southlake, TX (US); Nathan Hefner, Frederick, MD (US); Nicholas Lazarine, Dallas, TX (US); Patrick Van Deventer, Dallas, TX (US); John Martin, Dallas, TX (US); Eric Saletel, Baltimore, MD (US)

(73) Assignee: PwC Product Sales LLC, New York, NY (US)

( * ) Notice: Subject to any disclaimer, the term of this patent is extended or adjusted under 35 U.S.C. 154(b) by 534 days.

(21) Appl. No.: 17/386,153

(22) Filed: Jul. 27, 2021

(65) Prior Publication Data

US 2023/0036217 A1 Feb. 2, 2023

(51) Int. Cl.
| | | |
|---|---|---|
| G06F 17/30 | (2006.01) | |
| G06F 16/16 | (2019.01) | |
| G06F 16/22 | (2019.01) | |
| G06F 16/2457 | (2019.01) | |
| G06K 7/14 | (2006.01) | |
| G06K 19/06 | (2006.01) | |

(52) U.S. Cl.
CPC ...... *G06F 16/24573* (2019.01); *G06F 16/164* (2019.01); *G06F 16/22* (2019.01); *G06K 7/1413* (2013.01); *G06K 7/1417* (2013.01); *G06K 19/06028* (2013.01); *G06K 19/06037* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,880,890 B2 * 11/2014 Jung ...................... B41J 3/4076
380/282
10,922,358 B2 2/2021 Garg et al.
(Continued)

*Primary Examiner* — Hung D Le
(74) *Attorney, Agent, or Firm* — Morrison & Foerster LLP

(57) ABSTRACT

Systems and methods are provided for using a structured data database and for exchanging electronic files containing unstructured or partially structured data. A system stores first structured data in a database, wherein the structured data represents a property. The system generates an electronic file, including by (a) storing unstructured data in the electronic file, wherein the unstructured data causes a representation of the property to be rendered on a face of a document represented by the file and (b) storing an identifier in the electronic file indicating a location in the database at which the first structured data is stored. The file is transmitted outside the system. Upon receipt of a copy of the file, the system reads the identifier from the copy of the received file and accesses the database location indicated by the identifier read from the received file.

20 Claims, 4 Drawing Sheets

(56) References Cited

U.S. PATENT DOCUMENTS

| | | | |
|---|---|---|---|
| 2005/0034062 A1* | 2/2005 | Bufkin | G06F 40/169 |
| | | | 715/230 |
| 2005/0138127 A1* | 6/2005 | Jain | G06Q 10/107 |
| | | | 709/229 |
| 2005/0251679 A1* | 11/2005 | Narayanan | G06F 21/6227 |
| | | | 713/170 |
| 2008/0120382 A1* | 5/2008 | Heidloff | G06Q 10/107 |
| | | | 709/206 |
| 2019/0347254 A1* | 11/2019 | Mori | H04L 67/06 |
| 2020/0057951 A1* | 2/2020 | Soni | G06F 8/34 |
| 2021/0152509 A1* | 5/2021 | Lundberg | G06F 3/0486 |
| 2021/0232615 A1* | 7/2021 | Hoffmann | G06F 40/30 |
| 2021/0233008 A1* | 7/2021 | Gupta | G06F 16/355 |
| 2021/0271872 A1* | 9/2021 | Gupta | G06V 30/153 |
| 2021/0281421 A1* | 9/2021 | Semenovskiy | H04L 9/3247 |
| 2022/0078008 A1* | 3/2022 | Kong | G06F 21/645 |
| 2022/0292136 A1* | 9/2022 | Hubauer | G06F 16/906 |

\* cited by examiner

SYSTEMS AND METHODS FOR USING A STRUCTURED DATA DATABASE AND FOR EXCHANGING ELECTRONIC FILES CONTAINING UNSTRUCTURED OR PARTIALLY STRUCTURED DATA

FIELD

This present invention relates generally to systems and methods for the use of unstructured and/or partially structured data with a structured data database, and more particularly to facilitating the exchange of electronic files containing unstructured or partially structured data and using said files to facilitate access to structured data in a structured data database.

BACKGROUND

During data exchange processes, electronic files containing unstructured and/or partially structured data are often transmitted between parties. In order to maintain data at scale, structured data is used, for example by storing structured data in a structured data database. According to known techniques, using electronic files containing unstructured data in conjunction with systems using structured data requires generating structured data based on unstructured data of electronic files such that the generated structured data can be stored in a structured database. For example, entities may exchange unstructured data through electronic files such as a portable document format (PDF) file, but need to obtain data from said electronic files in a structured format (e.g., a data structure with a predefined format) for further data processing and/or for storage of data in one or more structured databases. Known methods for generating structured data based on electronic files containing unstructured and/or partially structured data may apply one or more document ingestion and processing algorithms, such as optical character recognition (OCR) algorithms and/or machine learning algorithms.

SUMMARY

As explained above, generating structured data based on electronic files containing unstructured and/or partially structured data may apply one or more document ingestion and processing algorithms, such as optical character recognition (OCR) algorithms and/or machine learning algorithms. However, such known methods of generating structured data from non-structured mediums may be computationally-intensive, time-consuming, and potentially inaccurate. Accordingly, there is a need for improved systems methods for efficiently, accurately, and quickly using electronic files containing unstructured or partially structured data in conjunction with systems requiring structured data.

Disclosed herein are systems and methods that may address one or more of the above-identified needs. In some embodiments, the a system for using a structured data database in conjunction with electronic files containing unstructured or partially structured data is disclosed. The system may facilitate the exchange between multiple systems/entities/parties of said electronic files containing unstructured or partially structured data. In addition to the unstructured or partially structured data stored therein, the electronic files may additionally comprise an identifier (e.g., a identifier stored as metadata as part of the electronic file) that indicates a location in a structured data database that is associated with the electronic file and/or with information represented in the electronic file. By using the identifier stored in the electronic file as a pointer to a location in the structured data database, the system may be able to access the location in the structured data database in order to retrieve structured data therefrom and/or in order to write structured data thereto.

In some embodiments, using the identifier stored in an electronic file to access a location in the structured data database may improve efficiencies in situations in which an electronic file makes a "round trip" from the system by being transmitted out from the system (e.g., to a third party system) and then later received back by the system. For example, upon receipt of the electronic file, instead of being required to apply one or more document ingestion algorithms to the file to generate structured data from the received unstructured electronic file, the system may be able to bypass one or more aspects of the document ingestion pipeline by simply using the identifier stored in the electronic file to directly access structured data that is already stored in the structured data database.

In some embodiments, systems and methods disclosed herein may be used to facilitate exchange of electronic files and maintenance of structured data associated with one or more of said electronic files. For example, the systems and methods disclosed herein may be used, in some embodiments, as part of a tax preparation and compliance process in which files containing unstructured and/or partially structured data, such as PDF tax forms (e.g., K-1 PDF documents) may be exchanged between and amongst various parties. In some embodiments, said PDF tax forms may be generated by one party and exchanged amongst one or more other parties before being sent back to the original party that generated for PDF tax forms. Using the systems and methods disclosed herein, tremendous efficiencies may be achieved by using identifiers embedded in said PDF tax forms to facilitate lookup of structured data associated with the PDF tax form rather than having to rely on document ingestion and data extraction algorithms to extract all unstructured data from the documents.

In some embodiments, a first method, for associating structured data with electronic files, is provided, the first method performed by a system comprising one or more processors, the first method comprising: storing structured data in a database, wherein the structured data indicates a first property; and generating an electronic file, wherein generating the electronic file comprises: generating and storing unstructured data in the electronic file, wherein the unstructured data is configured to cause a visual indication of the first property to be displayed by the electronic file; and storing an identifier in the electronic file, wherein the identifier indicates a location in the database at which the structured data is stored.

In some embodiments of the first method, generating the unstructured data in the file is based on the structured data stored in the database.

In some embodiments of the first method, the identifier is stored in a metadata field of the electronic file.

In some embodiments of the first method, the electronic file is configured to cause display of the identifier as an optical code.

In some embodiments, the first method further comprises: applying a checksum operation to the electronic file including the unstructured data and the identifier, thereby generating a checksum value; and storing the checksum value in association with the database location indicated by the identifier.

In some embodiments of the first method: the structured data is stored in accordance with a set of one or more configurations for storage in the database; and the unstructured data is not stored in accordance with the set of one or more configurations for storage in the database.

In some embodiments, a first system, for associating structured data with electronic files, is provided, the first system comprising one or more processors configured to cause the first system to: store structured data in a database, wherein the structured data indicates a first property; and generate an electronic file, wherein generating the electronic file comprises: generating and storing unstructured data in the electronic file, wherein the unstructured data is configured to cause a visual indication of the first property to be displayed by the electronic file; and storing an identifier in the electronic file, wherein the identifier indicates a location in the database at which the structured data is stored.

In some embodiments, a first non-transitory computer-readable storage medium, storing instructions for associating structured data with electronic files, is provided, the instructions configured to be executed by one or more processors of a system to cause the system to: store structured data in a database, wherein the structured data indicates a first property; and generate an electronic file, wherein generating the electronic file comprises: generating and storing unstructured data in the electronic file, wherein the unstructured data is configured to cause a visual indication of the first property to be displayed by the electronic file; and storing an identifier in the electronic file, wherein the identifier indicates a location in the database at which the structured data is stored.

In some embodiments, a second method, for accessing structured data, is provided, the second method performed by a system comprising one or more processors, the second method comprising: receiving an electronic file, the electronic file comprising unstructured data and an identifier, wherein the unstructured data is configured to cause a visual indication of the a property to be displayed by the electronic file; and in response to receiving the electronic file: reading the identifier from the electronic file; and accessing the database location indicated by the identifier, wherein the database location is configured to store structured data indicating the first property.

In some embodiments of the second method, accessing the database location comprises retrieving, from the database location, the structured data.

In some embodiments of the second method, accessing the database location comprises storing the structured data at the database location.

In some embodiments, the second method further comprises: in response to receiving the electronic file, reading the unstructured data from the electronic file; and generating the structured data based on the unstructured data read from the electronic file.

In some embodiments of the second method, the identifier is stored in a metadata field of the electronic file.

In some embodiments of the second method, reading the identifier from the electronic file comprises: reading an optical code that is caused to be displayed by the electronic file; and processing the optical code to obtain the identifier.

In some embodiments, the second method further comprises, in response to receiving the electronic file: applying a checksum operation to the electronic file including the unstructured data and the identifier, thereby generating a first checksum value; and comparing the first checksum value to a second checksum value that is stored in association with the database location indicated by the identifier; wherein accessing the database location is performed in accordance with determining, in accordance with comparing the first checksum value to the second checksum value, that the first and second checksum values match.

In some embodiments, a second system, for accessing structured data, is provided, the second system comprising one or more processors configured to cause the second system to: receive an electronic file, the electronic file comprising unstructured data and an identifier, wherein the unstructured data is configured to cause a visual indication of the a property to be displayed by the electronic file; and in response to receiving the electronic file: read the identifier from the electronic file; and access the database location indicated by the identifier, wherein the database location is configured to store structured data indicating the first property.

In some embodiments, a second non-transitory computer-readable storage medium, storing instructions for accessing structured data, is provided, the instructions configured to be executed by one or more processors of a system to cause the system to: receive an electronic file, the electronic file comprising unstructured data and an identifier, wherein the unstructured data is configured to cause a visual indication of the a property to be displayed by the electronic file; and in response to receiving the electronic file: read the identifier from the electronic file; and access the database location indicated by the identifier, wherein the database location is configured to store structured data indicating the first property.

In some embodiments, a third method, for facilitating data exchange, is provided, the third method performed by a system comprising one or more processors, the third method comprising: storing first structured data in a database, wherein the structured data indicates a first property; generating an electronic file, wherein generating the electronic file comprises: generating and storing first unstructured data in the electronic file, wherein the first unstructured data is configured to cause a visual indication of the first property to be displayed by the electronic file; and storing an identifier in the electronic file, wherein the identifier indicates a location in the database at which the first structured data is stored; transmitting the electronic file; receiving a copy of the electronic file, the copy of the electronic file comprising the first unstructured data and the identifier; and in response to receiving the copy of the electronic file: reading the identifier from the copy of the electronic file; and accessing the database location indicated by the identifier.

In some embodiments of the third method: the copy of the electronic file comprises second unstructured data distinct from the first unstructured data, the third method further comprises, in response to receiving the copy of the electronic file: reading the second unstructured data from the copy of the electronic file; and generating second structured data based on the second unstructured data read from the copy of the electronic file; and accessing the database location comprises storing the second structured data at the database location.

In some embodiments, a third system, for facilitating data exchange, is provided, the third system comprising one or more processors configured to cause the third system to: store first structured data in a database, wherein the structured data indicates a first property; generate an electronic file, wherein generating the electronic file comprises: generating and storing first unstructured data in the electronic file, wherein the first unstructured data is configured to cause a visual indication of the first property to be displayed by the electronic file; and storing an identifier in the electronic file, wherein the identifier indicates a location in the database at which the first structured data is stored; transmit the electronic file; receive a copy of the electronic file, the copy of the electronic file comprising the first unstructured data and the identifier; and in response to receiving the copy of the electronic file: read the identifier from the copy of the electronic file; and access the database location indicated by the identifier.

In some embodiments, a third non-transitory computer-readable storage medium, storing instructions for facilitating data exchange, is provided, the instructions configured to be executed by one or more processors of a system to cause the system to: store first structured data in a database, wherein the structured data indicates a first property; generate an electronic file, wherein generating the electronic file comprises: generating and storing first unstructured data in the electronic file, wherein the first unstructured data is configured to cause a visual indication of the first property to be displayed by the electronic file; and storing an identifier in the electronic file, wherein the identifier indicates a location in the database at which the first structured data is stored; transmit the electronic file; receive a copy of the electronic file, the copy of the electronic file comprising the first unstructured data and the identifier; and in response to receiving the copy of the electronic file: read the identifier from the copy of the electronic file; and access the database location indicated by the identifier.

In some embodiments, any one or more of the features of any one or more of the embodiments set forth above may be combined with one another, and/or with other features or aspects of any method, system, technique, or device disclosed herein. The subject matter of this application may involve, in some cases, interrelated products, alternative solutions to a particular problem, and/or a plurality of different uses of a single system or article.

Figure 1:
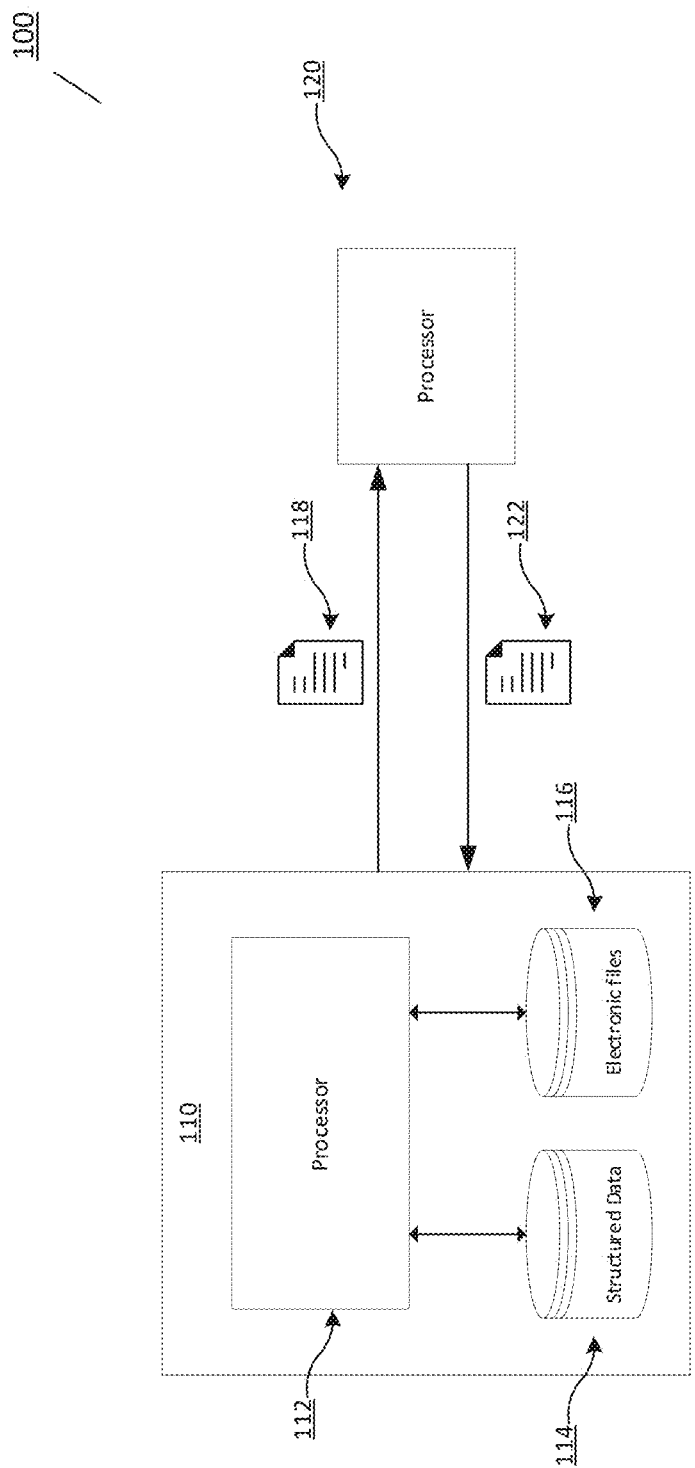
FIG. 1 shows a schematic representation of a system for using a structured data database and for exchanging electronic files containing unstructured or partially structured data, in accordance with some embodiments.

These and other features of the present embodiments may be understood better by reading the following detailed description, taken together with the figures herein described. In the drawings, identical or nearly identical components illustrated in multiple figures may be represented by a like reference numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Disclosed herein are systems and methods for using a structured data database in conjunction with electronic files containing unstructured or partially structured data is disclosed. The system may facilitate the exchange between multiple systems/entities/parties of said electronic files containing unstructured or partially structured data. In addition to the unstructured or partially structured data stored therein, the electronic files may additionally comprise an identifier (e.g., a identifier stored as metadata as part of the electronic file) that indicates a location in a structured data database that is associated with the electronic file and/or with information represented in the electronic file. By using the identifier stored in the electronic file as a pointer to a location in the structured data database, the system may be able to access the location in the structured data database in order to retrieve structured data therefrom and/or in order to write structured data thereto.

In some embodiments, a system may generate an outbound unstructured electronic file from a structured data. The system may store the structured data in a structured data database. The system may store the generated outbound unstructured electronic file in an unstructured file repository. The system may associate an identifier with the structured data in the structured database, wherein the identifier indicates a location in the database at which the structured data is stored. The system may associate the same identifier with the outbound unstructured electronic file. In some embodiments, the identifier may be associated with the outbound unstructured electronic file by being stored in a metadata field of the outbound unstructured electronic file. In some embodiments, the identifier may be associated with the outbound unstructured electronic file as an optical code displayed by the outbound unstructured electronic file.

In some embodiments, the system may receive an inbound unstructured electronic file. In some embodiments, the system may receive the inbound unstructured electronic file from an external system. In some embodiments, the system may receive the inbound unstructured electronic file from itself. The inbound unstructured electronic file may contain unstructured data and an identifier. In response to receiving the inbound unstructured electronic file, the system may retrieve the identifier from the inbound unstructured electronic file. In some embodiments, the system may retrieve the identifier stored in a metadata field of the inbound unstructured electronic file. In some embodiments, the system may retrieve the identifier by reading an optical code displayed by the inbound unstructured electronic file and processing the optical code. In some embodiments, the identifier may indicate a location in the unstructured file repository. In some embodiments, the system may store the inbound unstructured electronic file in the unstructured file repository at a location indicated by the identifier. In some embodiments, the identifier may indicate a location in the structured data database. In some embodiments, the system may retrieve the structured data from the structured data database using the identifier.

In some embodiments, the system may perform version control for data stored in the structured data database and the unstructured file repository. Version control may be performed to ensure that the data in the inbound unstructured electronic file corresponds to the structured data stored at the structured data database location indicated by the identifier associated with the inbound unstructured electronic file. In some embodiments, the system may perform version control by performing a checksum operation on the outbound unstructured electronic file (e.g., the unstructured data and the identifier), storing the checksum result at a structured data database location indicated by the identifier, performing a checksum operation on an inbound unstructured electronic file (e.g., the unstructured data and the identifier), and comparing this new checksum result with the checksum result at the structured data database location indicated by the identifier. In some embodiments, if the system determines that the two checksum values do not match, the system may extract structured data (e.g., using OCR and/or machine learning) from the inbound unstructured electronic file. In some embodiments, the system may store the extracted structured data in the structured data database at a location indicated by the identifier. In some embodiments, the system may store the inbound unstructured electronic file in the unstructured file repository at a location indicated by the identifier.

FIG. 1 shows a schematic representation of a system 100 for facilitated data extraction, in accordance with some embodiments. System 100 comprises document and data management system 110. Document and data management system 110 comprises processor 112 that executes instructions to perform any one or more the techniques disclosed herein, including but not limited to receiving structured data, generating unstructured electronic files from structured data, sending and receiving unstructured electronic files, and accessing data stored in databases.

Document and data management system 110 also comprises one or more computer storage devices configured to provide a structured data database 114 and an unstructured file repository 116. Structured data database 114 is configured to store structured data. In some embodiments, the structured data may be stored according to any predefined data format, such as by storing data as a table or in accordance with any suitable database schema. In some embodiments, the structured data may be stored using JavaScript Object Notation (JSON). In some embodiments, the structured data may be in the form of any data structure with a known format (e.g., a format defined by an administrative user). Unstructured file repository 116 may be configured to store unstructured electronic files, such as any electronic file containing data that is wholly or partially inconsistent with the structured data format(s) used for structured data database 114. In some embodiments, the unstructured electronic files stored in unstructured file repository 116 may include files in PDF format.

Processor 112 is communicatively connected with structured data database 114 and unstructured file repository 116 such that document and data management system 110 is able to access data in structured data database 114 and unstructured file repository 116. In some embodiments, processor 112 may be connected with structured data database 114 and unstructured file repository 116 by any suitable wired or wireless electronic communication protocol. In some embodiments, accessing data may include reading data stored in structured data database 114 and unstructured file repository 116. In some embodiments, accessing data may include writing data to structured data database 114 and unstructured file repository 116.

System 100 also comprises external system processor 120. External system processor 120 is communicatively connected to document and data management system 110 and configured to be able to send and receive data to and from system 110, including by sending and receiving unstructured files such as files 118 and 122. In some embodiments, external system processor 120 may be connected to document and data management system by any suitable wired or wireless electronic communication protocol. While FIG. 1 contemplates external system processor 120 as a processor of a system that is located remotely from system 110 (e.g., such that communication between system 110 and processor 120 may be via a wide area network such as the internet), such as a computer system operated by a separate user, separate corporation, and/or separate entity from the entity operating system 110, it should be noted that system 100 may in some embodiments be deployed internally to a single entity, such that processor 120 and system 110 may be disposed within a single local network and/or controlled by a single user or set of users.

In some embodiments, document and data management system 110 may send outbound unstructured electronic file 118 to external system processor 120. Document and data management system 110 may receive inbound unstructured electronic file 122 from external system processor 120. In some embodiments, inbound unstructured electronic file 122 may be a copy (e.g., an unmodified copy or a modified copy) of outbound unstructured electronic file 118, wherein inbound unstructured electronic file 122 includes some or all of the same unstructured data and identifier as outbound unstructured electronic file 118. In some embodiments, inbound unstructured electronic file 122 may be a modified version of outbound unstructured electronic file 118, wherein inbound unstructured electronic file 122 has the same identifier as outbound unstructured electronic file 118, but inbound unstructured electronic file 122 includes at least some different unstructured data than outbound unstructured electronic file 118. In some embodiments, inbound unstructured electronic file 122 may be a different file/document than outbound unstructured electronic file 118, wherein inbound unstructured electronic file 122 has a different identifier than outbound unstructured electronic file 118.

In some embodiments, an identifier that is included in file 118 and/or in file 122 may be stored as metadata within the electronic file. The identifier may be any suitable identifier (e.g., code, classification, UUID, etc.) that indicates the identity of the document and/or information about the document. In some embodiments, the identifier may indicate a unique identity of the document. In some embodiments, the identifier may indicate one or more types or classifications into which the document falls. In some embodiments, the identifier may indicate any suitable metadata regarding the document. In some embodiments, the identifier may indicate one or more locations in one or more databases (e.g., database 114) associated with the document, such as by indicating a location to which information regarding the document should be stored and/or by indicating a location from which information regarding the document should be read.

In some embodiments, the identifier may be stored as metadata within the electronic file. In some embodiments, the identifier may be stored as metadata that is additive and does not replace or overwrite any other metadata fields in a file, such as a PDF document. For example, by taking advantage of Adobe's Extensible Metadata Platform (XMP), a key value pair may be added to the additional metadata. For example, the metadata may be stored as "LocatorId": "GUID", where "GUID" is a placeholder in this context. Part of the process in generating a single form may be to create and associate a Globally Unique IDentifier (GUID) for the document. The GUID may serve as a link between the document and the underlying structured data that is retained.

In some embodiments, the identifier may be stored as metadata that replaces or overwrites other metadata, and/or is stored in a field that is configured, in accordance with a standard data specification, to indicate another kind of metadata or another kind of information.

In some embodiments, the identifier may be stored in the form of a globally unique identifier (GUID). In some embodiments, the identifier may comprise a character string (e.g., "30f0a213-445e-4276-a527-4156482af149". In some embodiments, the identifier may be stored as part of the electronic file in such a manner that it is machine-readable. In some embodiments, the identifier (or a representation thereof) may be rendered visually on a face of the electronic document when the electronic document is displayed; for example the identifier or a representation thereof may be displayed as a human-readable code and/or as a machine-readable optical code (e.g., bar-code, QR code, etc.).

In some embodiments, system 110 may be configured to send and receive unstructured electronic files (e.g., files 118 and 122) containing identifiers that indicate a location in structured data database 114. System 110 may be configured to create unstructured files including said identifiers (e.g., stored as metadata within the files) that point to a location in structured data database 114 associated with said file. After creating said file(s), system 110 may send said files to one or more other systems or other parties, such as by sending file 118 to processor 120.

Upon receipt of a file, such as file 122, system 110 may automatically check whether the received file includes an identifier stored in metadata of the received file. If the file does not include an identifier, then system 110 may subject the received file to one or more document ingestion processing techniques in order to extract information from the received file, and to optionally use said extracted information to determine a location in a database (e.g., structured database 114) to which information should be written and/or from which information should be retrieved. On the other hand, if the file does include an identifier, then system 110 may bypass one or more aspects of the document ingestion processing techniques and may instead use the identifier to quickly and efficiently determine a location in a database (e.g., structured database 114) to which information should be written and/or from which information should be retrieved.

In some embodiments, system 110 may perform one or more document ingestion processing techniques irrespective of whether the inbound file includes an identifier; for example, system 110 may use an identifier in the file to automatically determine a location in database 114 associated with the inbound file, and may nevertheless perform one or more document ingestion processing techniques to extract information from the incoming file, and for example to optionally write said extracted information to the database location indicated by the identifier.

In some embodiments, system 110 may use an identifier included in the incoming file in order to determine whether or how to subject the incoming file to one or more document ingestion processing techniques. In some embodiments, the included identifier may itself include an explicit indication of whether one or more document ingestion processing techniques should be applied to the file, an identification of which document ingestion processing techniques should be applied to the file, and or a manner in which one or more document ingestion processing techniques should be applied to the file (e.g., if only certain pages should be scanned, etc.). In some embodiments, the included identifier may include a pointer to a database location and/or to another location, wherein the location is a location at which information is stored indicating whether one or more document ingestion processing techniques should be applied to the file. Upon receipt of the incoming file, system 110 may in some embodiments read said indication(s) from the included identifier and/or may look up said indication(s) at a location indicated by the included identifier, and may proceed in accordance with the ingestion processing techniques that are indicated by said indication(s).

Below, exemplary methods of using a structured data database and of exchanging electronic files containing unstructured or partially structured data is explained with reference to FIGS. 2 and 3. In some embodiments, all or part of the methods and techniques described with respect to FIGS. 2 and 3 may be performed by an electronic system such as system 100 described with respect to FIG. 1.

Figure 2:
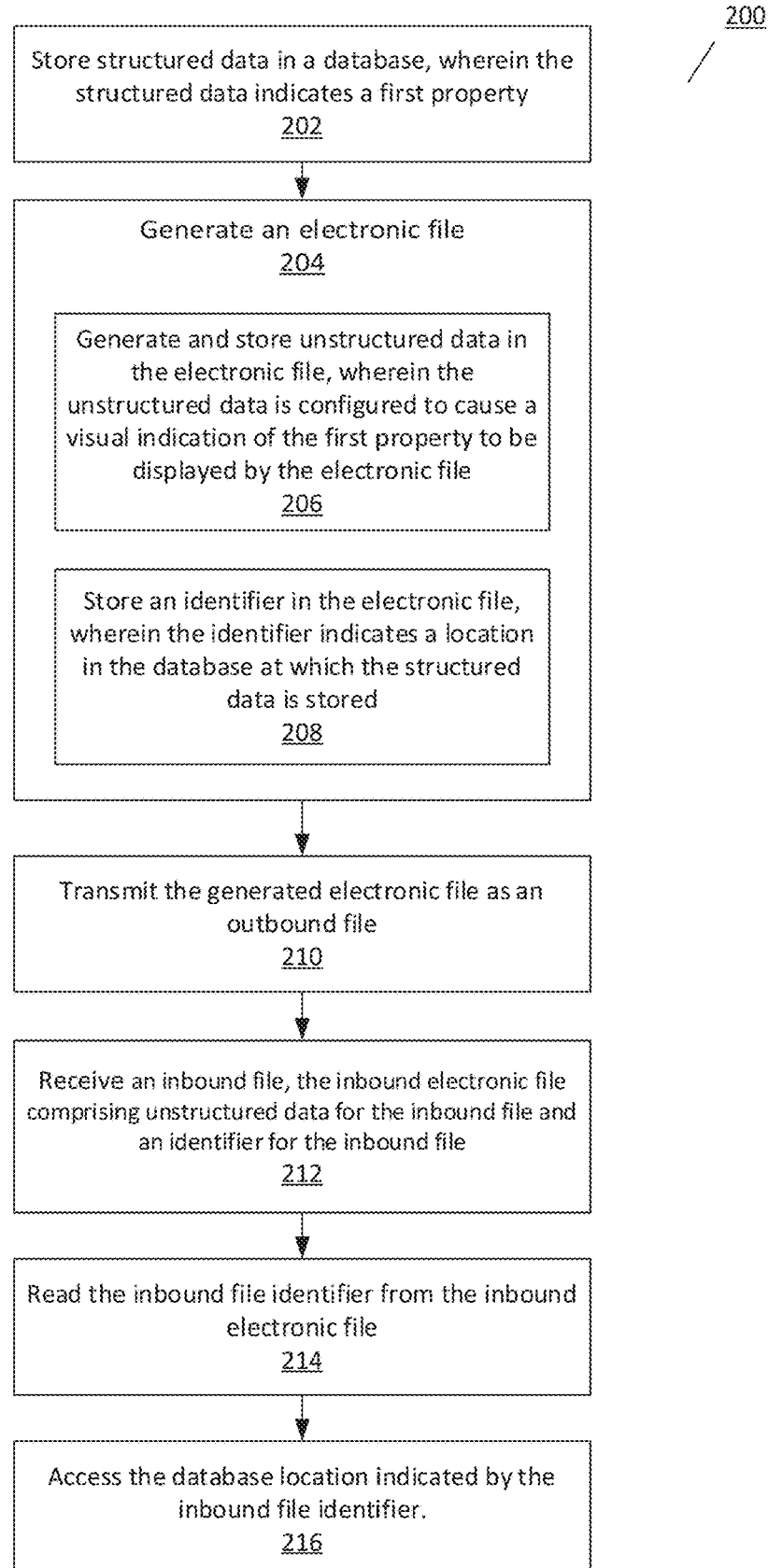
FIG. 2 shows a flowchart showing a method for using a structured data database and for exchanging electronic files containing unstructured or partially structured data, in accordance with some embodiments.

FIG. 2 shows a flowchart showing a method 200 for using a structured data database and exchanging electronic files containing unstructured or partially structured data, in accordance with some embodiments. Method 200 may be performed by one or more processors of a system for document management and/or data storage, such as processor 112 of system 100.

At block 202, the system may generate and store structured data in a structured data database, wherein the structured data indicates a first property. For example, document and data management system 110 stores structured data in structured data database 114. In some embodiments, the first property indicated by the structured data may be any substantive informational content; in the example of a tax preparation and compliance process, the information stored in the structured data database may be tax information for a particular entity. The structured data stored in the structured data database may be stored at a particular location in the database and may be stored in a predefined structured data format.

At block 204, the system may generate an electronic file associated with the structured data stored in the structured data database. The generated electronic file may be a file in any suitable file format, including but not limited to a PDF document file, a word processing document file, a workbook file, an image file, an audio file, and/or a video file. In the example of system 100, document and data management system 110 may generate outbound unstructured electronic file 118, wherein file 118 includes unstructured data that represents or is associated with all or part of the structured data that was stored in the structured data database at block 202.

At block 206, generating the electronic file may include generating and storing unstructured data in the electronic file, wherein the unstructured data is configured to cause a visual indication of the first property to be displayed by the electronic file. In some embodiments, the generated file may be considered an unstructured file with respect to the structured database, in that data stored in the file may not be in the structured data format required by the structured database. In some embodiments, some or all of the informational content of the generated file may nonetheless overlap with the informational content of the structured data stored at block 202. For example, the unstructured data stored as a part of the electronic file may indicate the same first property that is indicated by the structured data stored in the database at block 202. In the example of a tax preparation and compliance process, the first property stored in the database may indicate a particular piece of tax information for a particular entity, and the generated electronic file may indicate said same particular piece of information as provided in the electronic file as part of, for example, a PDF tax document. The information indicating the first property (e.g., the tax information) may thus be caused to be visually displayed by the electronic file, such as being displayed on the face of an electronic PDF document.

At block 208, in some embodiments, generating the electronic file may include storing an identifier in the electronic file, wherein the identifier indicates a location in the database at which the structured data is stored. In the example of system 100, document and data management system 110 stores an identifier in the outbound unstructured electronic file 118, wherein the identifier indicates a location in the structured data database 114 at which the structured data is stored.

The stored identifier may be stored as metadata in the file, for example by being stored in a metadata field of the generated file. In some embodiments, the stored identifier may have any one or more characteristics of the identifier(s) explained above with respect to FIG. 1, including that the stored identifier may indicate a unique identity of the document, one or more types or classifications into which the document falls, and/or one or more locations in one or more databases (e.g., database 114) associated with the document. The database location indicated by the identifier may be a location to which information associated with the document is to be stored (e.g., written) by the system and/or a location from which information associated with the document is to be read by the system.

At block 210, the system may transmit the generated electronic file as an outbound file. In the example of system 100, document and data management system 110 transmits outbound unstructured electronic file 118 to external system processor 120. Transmission of the generated document may be carried out using one or more transmission steps, using one or more intermediate parties or devices, and using any one or more suitable wired or wireless network communication protocols.

At block 212, the system may receive an inbound electronic file, wherein the inbound electronic file includes an identifier (e.g., as discussed above) stored as part of the electronic file. Receipt of the inbound electronic file may be via any one or more suitable wired or wireless network communication protocols. In the example of system 100, document and data management system 110 receives inbound unstructured electronic file 122, inbound unstructured electronic file 122 comprising unstructured data and an identifier for inbound unstructured electronic file 122.

In some embodiments, inbound unstructured electronic file 122 may be a copy of outbound unstructured electronic file 118. In some embodiments, inbound unstructured electronic file 122 may be a modified version of outbound unstructured electronic file 118, wherein inbound unstructured electronic file 122 has the same identifier as outbound unstructured electronic file 118 but the unstructured data of inbound unstructured electronic file 122 differs from that of outbound unstructured electronic file 118. In some embodiments, inbound unstructured electronic file 122 differs from that of outbound unstructured electronic file 118, wherein inbound unstructured electronic file 122 has a different identifier than outbound unstructured electronic file 118.

In some embodiments, upon receipt of the inbound electronic file, it may be unknown to the system as to whether the file is a known file, an unknown file, a copy of a previously distributed file, a file that is associated with a known structured database, or a file that is not associated with a known structure database. As discussed below (and elsewhere herein), the system may, upon receipt of the inbound file, read the included identifier from the inbound electronic file in order to determine an identity of the file, determine a classification of the file, determine a location in a database associated with the file, and/or determine a manner in which the inbound file should be processed by the system.

At block 214, the system may read the identifier from the inbound electronic file. In some embodiments, reading the identifier comprises reading data included in an identifier that is stored as metadata in the electronic file. In some embodiments, reading the identifier may comprise performing one or more file-recognition operations (e.g., optical character recognition) on the inbound file in order to recognize and read a visualization of the identifier that is displayed on a face of a document represented by the file, for example when the identifier is displayed as a visible human-readable character string (e.g., an identification number) and/or as an optical code (e.g., a bar-code or QR code). In the example of system 100, document and data management system 110 reads the inbound file identifier from inbound unstructured electronic file 122.

As discussed herein, based on the information read from the identifier, the system may take one or more automated actions, including but not limited to accessing a database location indicated by the identifier, writing information to an accessed database location, reading information from an accessed database location, and/or processing the inbound document in accordance with one or more ingestion processes indicated by the identifier or indicated by data stored at a location indicated by the identifier.

At block 216, the system may access a location indicated by the identifier in the inbound file. In the example of system 100, document and data management system 110 accesses the location indicated by inbound file identifier of the structured data database 114. In some embodiments, accessing the database location comprises retrieving, from the database location, structured data, such as structured data that was previously stored at the database location, for example in the case in which the inbound document is a "round trip" document that was originally created by the system and for which structured data has already been stored. In some embodiments, retrieving structured data from the database may obviate the need to extract information from the received document itself, for example because the extracted information may be redundant with the information already stored in the database.

In some embodiments, accessing the database location comprises reading metadata from the database location. The metadata stored at the database location may include one or more document ingestion procedures for ingestion the document, for example specifying which document ingestion processing techniques should be applied to the inbound document and/or specifying a manner in which one or more document ingestion processing techniques should be applied to the inbound document (e.g., a time at which they should be applied, an order in which they should be applied, and/or one or more portions of the document to which they should be applied).

In some embodiments, accessing the database location comprises storing structured data at the database location; in some embodiments, structured data stored at the database location may include data regarding the inbound file (e.g., metadata regarding the received file) and/or information extracted from the inbound file (e.g., information read from unstructured data included in the inbound file).

Figure 3:
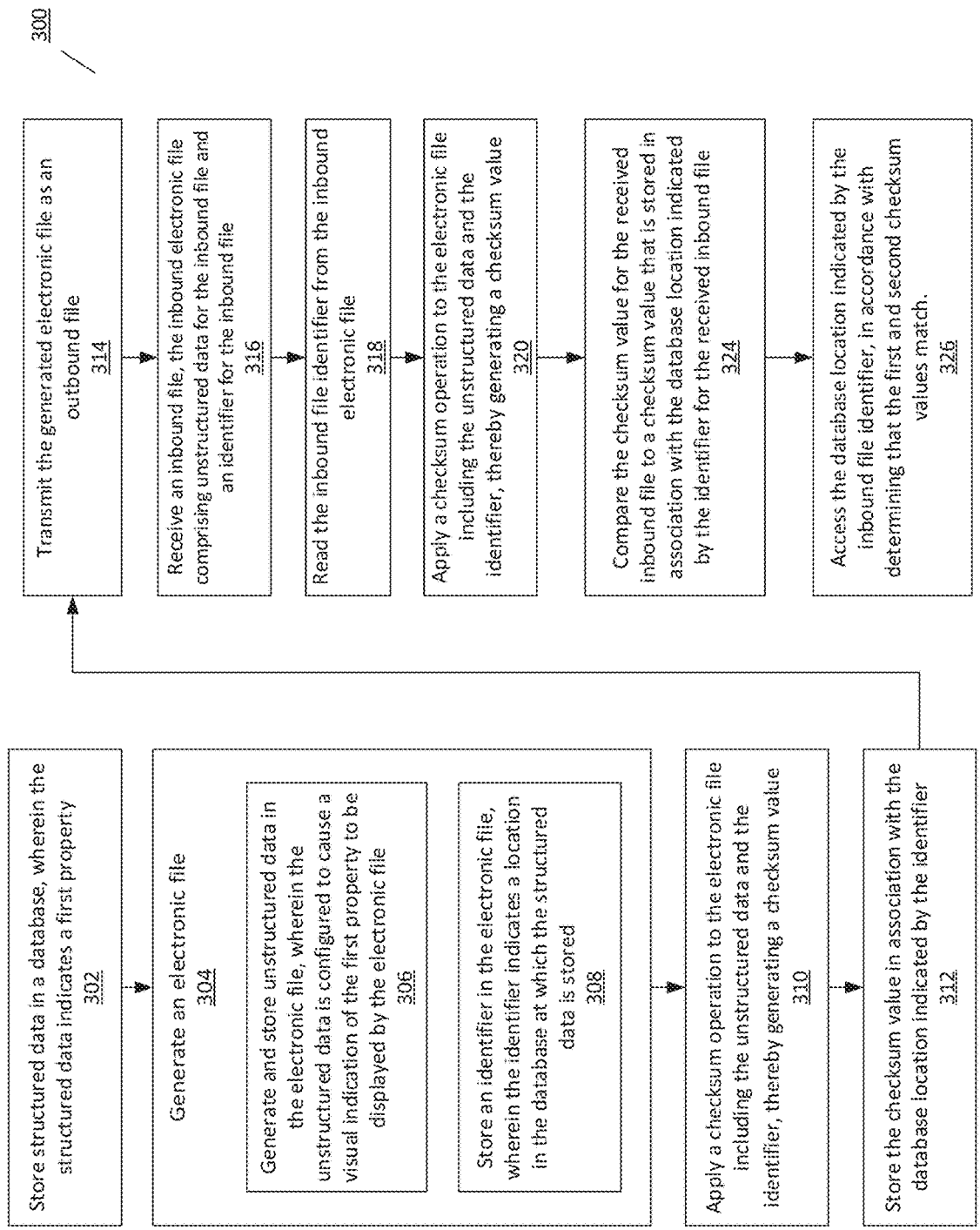
FIG. 3 shows a flowchart showing a method for performing version control, in accordance with some embodiments.

FIG. 3 shows a flowchart showing a method 300 for performing version control while using a structured data database and exchanging electronic files containing unstructured or partially structured data, in accordance with some embodiments. Method 300 may be performed by one or more processors of a system for document management and/or data storage, such as processor 112 of system 100. As shown below, method 300 may share one or more characteristics in common with method 200, while method 300 may include use of a checksum comparison operation to perform version control in order to determine whether a received inbound electronic file matches an outbound electronic file that was previously transmitted.

At block 302, the system may generate and store structured data in a structured data database, wherein the structured data indicates a first property. In some embodiments, block 302 may share any one or more characteristics in common with block 202 described above with respect to FIG. 2.

At block 304, the system may generate an electronic file associated with the structured data stored in the structured data database. In some embodiments, block 304 may share any one or more characteristics in common with block 204 described above with respect to FIG. 2.

At block 306, generating the electronic file may include generating and storing unstructured data in the electronic file, wherein the unstructured data is configured to cause a visual indication of the first property to be displayed by the electronic file. In some embodiments, block 306 may share any one or more characteristics in common with block 206 described above with respect to FIG. 2.

At block 308, in some embodiments, generating the electronic file may include storing an identifier in the electronic file, wherein the identifier indicates a location in the database at which the structured data is stored. In some embodiments, block 308 may share any one or more characteristics in common with block 208 described above with respect to FIG. 2.

At block 310, the system may apply a checksum operation (e.g., a checksum function) to the electronic file, including the unstructured data and the identifier, thereby generating a checksum value. In the example of system 100, document and data management system 110 generates a checksum value by applying a checksum operation to outbound unstructured electronic file 118. In some embodiments, the generated checksum value may be any suitable numerical value and/or string of characters.

At block 312, the checksum value generated at block 310 is stored at or in association with a location indicated by the identifier. In the example of system 100, document and data management system 110 may store the generated checksum value at, or in association with, the location in database 114 that is indicated by the indicator stored in electronic file 118.

At block 314, the system may transmit the generated electronic file as an outbound file. In some embodiments, block 314 may share any one or more characteristics in common with block 210 described above with respect to FIG. 2.

At block 316, the system may receive an inbound electronic file, wherein the inbound electronic file includes an identifier (e.g., as discussed above) stored as part of the electronic file. In some embodiments, block 316 may share any one or more characteristics in common with block 212 described above with respect to FIG. 2.

In some embodiments, inbound unstructured electronic file 122 may be a copy of outbound unstructured electronic file 118. In some embodiments, inbound unstructured electronic file 122 may be a modified version of outbound unstructured electronic file 118, wherein inbound unstructured electronic file 122 has the same identifier as outbound unstructured electronic file 118 but the unstructured data of inbound unstructured electronic file 122 differs from that of outbound unstructured electronic file 118. In some embodiments, inbound unstructured electronic file 122 differs from that of outbound unstructured electronic file 118, wherein inbound unstructured electronic file 122 has a different identifier than outbound unstructured electronic file 118.

In some embodiments, upon receipt of the inbound electronic file, it may be unknown to the system as to whether the file is a known file, an unknown file, a copy of a previously distributed file, a file that is associated with a known structured database, or a file that is not associated with a known structure database. As discussed below (and elsewhere herein), the system may, upon receipt of the inbound file, read the included identifier from the inbound electronic file in order to determine an identity of the file, determine a classification of the file, determine a location in a database associated with the file, and/or determine a manner in which the inbound file should be processed by the system. As further discussed below, the system may, upon receipt of the inbound file, apply one or more checksum operations to the inbound file in order to determine whether the file matches the identity of a previously-known file for which a checksum has been stored.

At block 318, the system may read the identifier from the inbound electronic file. In some embodiments, block 318 may share any one or more characteristics in common with block 214 described above with respect to FIG. 2.

At block 320 (which may in some embodiments be performed before or after block 318), the system applies a checksum operation to the received electronic file, including the unstructured data and the identifier, thereby generating a checksum value for the inbound file. In the example of system 100, document and data management system 110 generates a checksum value by applying a checksum operation to inbound unstructured electronic file 122. In some embodiments, the checksum operation (e.g., the checksum algorithm) applied to the inbound file may be the same checksum operation that was applied to the outbound file discussed above with respect to block 310. In some embodiments, a system may be configured to apply a same checksum operation to inbound files at the system applies to outbound files, such that the system can check whether checksum values for inbound files match the stored checksum values that were generated for outbound files. Verifying that the values match may allow the system to ensure that an inbound file matches a file that was previously generated and transmitted, that the file has not been edited or tampered with, and that the file is a same version as the previously stored and transmitted file.

At block 324, the system may compare the checksum value for the received inbound file to a checksum value that is stored in association with the database location indicated by the identifier for the received inbound file. In some embodiments, the system use the identifier of the inbound file to look up a stored checksum value that is stored at a location indicated by the identifier, and may then compare the stored checksum value to the newly-generated checksum value for the inbound file. In some embodiments, for example when the inbound file is a copy of the file that was transmitted at block 314, the stored checksum value may be the checksum value that was generated and stored at block 312. In the example of system 100, document and data management system 110 retrieves the checksum value that is stored in structured data dataset 114 at a location indicated by the identifier of the inbound unstructured electronic file 122 and compares the new checksum value calculated at block 320 with the retrieved checksum value.

Verifying that the values match may allow the system to determined that the inbound file matches the file that was previously generated. If the checksum values do not match, then the system may determine that the file does not match a file that was previously generated, and the system may in some embodiments take one or more automated actions. For example, the system may automatically generate one or more alerts or alarms, may automatically discard or delete the file, may automatically subject the file to one or more file security or data security procedures, and/or may automatically subject the file to one or more automated data ingestion processing techniques in order to extract information from the inbound file and/or to identify differences in the inbound file from the previously-generated file to which it is not an exact match.

At block 326, the system may access the database location (including, e.g., reading information from and/or writing information to the database location) indicated by the inbound file identifier, in accordance with determining that the first and second checksum values match. In some embodiments, block 326 may share any one or more characteristics in common with block 216 described above with respect to FIG. 2. In some embodiments, the system may be configured to automatically perform one or more database access operations in accordance with the determination as to whether the checksum value generated for the inbound file matches a previously generated checksum value. For example, in some embodiments, if the checksum values match, the system may automatically read information from the structured data database at a location indicated by the identifier for the inbound file and/or may automatically write information to the structured data database at a location indicated by the identifier for the inbound file. The system may be configured such that, on the other hand, if the checksum values do not match, the system does not access the database location, does not read from the database location, and/or does not write to the database location.

In some embodiments, if the first and second checksum values do not match, document and data management system 110 may determine that the inbound electronic file (e.g., file 122) is a modified version of an outbound unstructured electronic file (e.g., file 118). In some embodiments, the system may be configured to extract information from the inbound file in order to determine what modifications have been made to the inbound file. In some embodiments, the system may be configured to write information to the associated database location regarding the modified information in the inbound file (optionally while not writing information to the database location regarding information in the inbound file that has not been modified).

Figure 4:
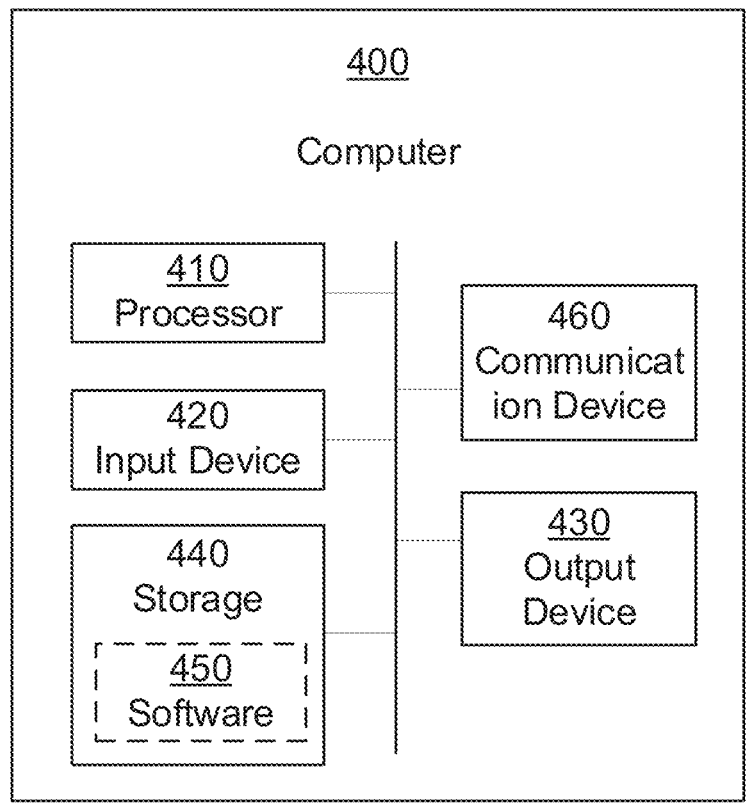
FIG. 4 shows a computer, in accordance with some embodiments.

FIG. 4 illustrates an example of a computer, according to some embodiments. Computer 400 can be a component of a facilitated data extraction system according to the systems and methods described above, such as system 100 of FIG. 1. In some embodiments, computer 400 may execute a method for performing all or part of any one or more of the methods described herein, such as method 200 and/or method 300.

Computer 400 can be a host computer connected to a network. Computer 400 can be a client computer or a server. As shown in FIG. 4, computer 400 can be any suitable type of microprocessor-based device, such as a personal computer, workstation, server, or handheld computing device, such as a phone or tablet. The computer can include, for example, one or more of processor 410, input device 420, output device 430, storage 440, and communication device 460. Input device 420 and output device 430 can correspond to those described above and can either be connectable or integrated with the computer.

Input device 420 can be any suitable device that provides input, such as a touch screen or monitor, keyboard, mouse, or voice-recognition device. Output device 430 can be any suitable device that provides an output, such as a touch screen, monitor, printer, disk drive, or speaker.

Storage 440 can be any suitable device that provides storage, such as an electrical, magnetic, or optical memory, including a random access memory (RAM), cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can include a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A method for associating structured data with electronic files, the method performed by a system comprising one or more processors, the method comprising:
    storing structured data in a database, wherein the structured data indicates a first property; and
    generating an electronic file, wherein generating the electronic file comprises:
        generating and storing unstructured data in the electronic file, wherein the unstructured data is configured to cause a visual indication of the first property to be displayed by the electronic file; and
        storing an identifier in the electronic file, wherein the identifier indicates a location in the database at which the structured data is stored, and wherein the identifier is stored in a metadata field of the electronic file.

2. The method of claim 1, wherein generating the unstructured data in the file is based on the structured data stored in the database.

3. The method of claim 1, wherein the electronic file is configured to cause display of the identifier as an optical code.

4. The method of claim 1, further comprising:
    applying a checksum operation to the electronic file including the unstructured data and the identifier, thereby generating a checksum value; and
    storing the checksum value in association with the database location indicated by the identifier.

5. The method of claim 1, wherein:
    the structured data is stored in accordance with a set of one or more configurations for storage in the database; and
    the unstructured data is not stored in accordance with the set of one or more configurations for storage in the database.

6. A system for associating structured data with electronic files, the system comprising one or more processors configured to cause the system to:
    store structured data in a database, wherein the structured data indicates a first property; and
    generate an electronic file, wherein generating the electronic file comprises:
        generating and storing unstructured data in the electronic file, wherein the unstructured data is configured to cause a visual indication of the first property to be displayed by the electronic file; and
        storing an identifier in the electronic file, wherein the identifier indicates a location in the database at which the structured data is stored, and wherein the identifier is stored in a metadata field of the electronic file.

7. A non-transitory computer-readable storage medium storing instructions for associating structured data with electronic files, the instructions configured to be executed by one or more processors of a system to cause the system to:
    store structured data in a database, wherein the structured data indicates a first property; and
    generate an electronic file, wherein generating the electronic file comprises:
        generating and storing unstructured data in the electronic file, wherein the unstructured data is configured to cause a visual indication of the first property to be displayed by the electronic file; and
        storing an identifier in the electronic file, wherein the identifier indicates a location in the database at which the structured data is stored, and wherein the identifier is stored in a metadata field of the electronic file.

8. A method for accessing structured data, the method performed by a system comprising one or more processors, the method comprising:
    receiving an electronic file, the electronic file comprising unstructured data and an identifier, wherein the unstructured data is configured to cause a visual indication of a first property to be displayed by the electronic file, wherein the identifier is stored in a metadata field of the electronic file, and wherein the identifier indicates a location in the database at which the structured data is stored; and
    in response to receiving the electronic file:
    reading the identifier from the electronic file; and
    accessing the database location indicated by the identifier, wherein the database location is configured to store structured data indicating the first property.

9. The method of claim 8, wherein accessing the database location comprises retrieving, from the database location, the structured data.

10. The method of claim 8, wherein accessing the database location comprises storing the structured data at the database location.

11. The method of claim 8, further comprising:
    in response to receiving the electronic file, reading the unstructured data from the electronic file; and
    generating the structured data based on the unstructured data read from the electronic file.

12. The method of claim 8, wherein the identifier is stored in a metadata field of the electronic file.

13. The method of claim 8, wherein reading the identifier from the electronic file comprises:
    reading an optical code that is caused to be displayed by the electronic file; and
    processing the optical code to obtain the identifier.

14. The method of claim 8, further comprising, in response to receiving the electronic file:
    applying a checksum operation to the electronic file including the unstructured data and the identifier, thereby generating a first checksum value; and
    comparing the first checksum value to a second checksum value that is stored in association with the database location indicated by the identifier;
    wherein accessing the database location is performed in accordance with determining, in accordance with comparing the first checksum value to the second checksum value, that the first and second checksum values match.

15. A system for accessing structured data, the system comprising one or more processors configured to cause the system to:
receive an electronic file, the electronic file comprising unstructured data and an identifier, wherein the unstructured data is configured to cause a visual indication of the a property to be displayed by the electronic file; and
in response to receiving the electronic file:
read the identifier from the electronic file; and
access the database location indicated by the identifier, wherein the database location is configured to store structured data indicating the first property.

16. A non-transitory computer-readable storage medium storing instructions for accessing structured data, the instructions configured to be executed by one or more processors of a system to cause the system to:
receive an electronic file, the electronic file comprising unstructured data and an identifier, wherein the unstructured data is configured to cause a visual indication of a first property to be displayed by the electronic file, and wherein the identifier is stored in a metadata field of the electronic file, and wherein the identifier indicates a location in the database at which the structured data is stored; and
in response to receiving the electronic file:
read the identifier from the electronic file; and
access the database location indicated by the identifier, wherein the database location is configured to store structured data indicating the first property.

17. A method for facilitating data exchange, the method performed by a system comprising one or more processors, the method comprising:
storing first structured data in a database, wherein the structured data indicates a first property;
generating an electronic file, wherein generating the electronic file comprises:
generating and storing first unstructured data in the electronic file, wherein the first unstructured data is configured to cause a visual indication of the first property to be displayed by the electronic file; and
storing an identifier in the electronic file, wherein the identifier indicates a location in the database at which the first structured data is stored, and wherein the identifier is stored in a metadata field of the electronic file;
transmitting the electronic file;
receiving a copy of the electronic file, the copy of the electronic file comprising the first unstructured data and the identifier; and
in response to receiving the copy of the electronic file:
reading the identifier from the copy of the electronic file; and
accessing the database location indicated by the identifier.

18. The method of claim 17, wherein:
the copy of the electronic file comprises second unstructured data distinct from the first unstructured data, the method further comprises, in response to receiving the copy of the electronic file:
reading the second unstructured data from the copy of the electronic file; and
generating second structured data based on the second unstructured data read from the copy of the electronic file; and
accessing the database location comprises storing the second structured data at the database location.

19. A system for facilitating data exchange, the system comprising one or more processors configured to cause the system to:
store first structured data in a database, wherein the structured data indicates a first property;
generate an electronic file, wherein generating the electronic file comprises:
generating and storing first unstructured data in the electronic file, wherein the first unstructured data is configured to cause a visual indication of the first property to be displayed by the electronic file; and
storing an identifier in the electronic file, wherein the identifier indicates a location in the database at which the first structured data is stored, and wherein the identifier is stored in a metadata field of the electronic file;
transmit the electronic file;
receive a copy of the electronic file, the copy of the electronic file comprising the first unstructured data and the identifier; and
in response to receiving the copy of the electronic file:
read the identifier from the copy of the electronic file; and
access the database location indicated by the identifier.

20. A non-transitory computer-readable storage medium storing instructions for facilitating data exchange, the instructions configured to be executed by one or more processors of a system to cause the system to:
store first structured data in a database, wherein the structured data indicates a first property;
generate an electronic file, wherein generating the electronic file comprises:
generating and storing first unstructured data in the electronic file, wherein the first unstructured data is configured to cause a visual indication of the first property to be displayed by the electronic file; and
storing an identifier in the electronic file, wherein the identifier indicates a location in the database at which the first structured data is stored, and wherein the identifier is stored in a metadata field of the electronic file;
transmit the electronic file;
receive a copy of the electronic file, the copy of the electronic file comprising the first unstructured data and the identifier; and
in response to receiving the copy of the electronic file:
read the identifier from the copy of the electronic file; and
access the database location indicated by the identifier.

* * * * *